(12) United States Patent
Sobczak et al.

(10) Patent No.: US 9,531,482 B2
(45) Date of Patent: Dec. 27, 2016

(54) CANISTER ANTENNA PRODUCING A PSEUDO-OMNI RADIATION PATTERN FOR MITIGATING PASSIVE INTERMODULATION (PIM)

(71) Applicant: CSS Antenna, LLC, Edgewood, MD (US)

(72) Inventors: David M. Sobczak, Lutherville, MD (US); Salvatore Bentivenga, Ellicott City, MD (US); Suketu G. Shah, Elliott City, MD (US)

(73) Assignee: CSS Antenna, LLC, Edgewood, MD (US)

( * ) Notice: Subject to any disclaimer, the term of this patent is extended or adjusted under 35 U.S.C. 154(b) by 5 days.

(21) Appl. No.: 14/559,998

(22) Filed: Dec. 4, 2014

(65) Prior Publication Data

US 2015/0156642 A1    Jun. 4, 2015

Related U.S. Application Data

(60) Provisional application No. 61/911,776, filed on Dec. 4, 2013.

(51) Int. Cl.
| | | |
|---|---|---|
| *H01Q 3/02* | (2006.01) |
| *H01Q 25/00* | (2006.01) |
| *H04B 1/10* | (2006.01) |
| *H04B 15/00* | (2006.01) |
| *H04B 1/40* | (2015.01) |
| *H01Q 1/24* | (2006.01) |
| *H01Q 1/42* | (2006.01) |
| *H01Q 1/52* | (2006.01) |
| *H01Q 9/04* | (2006.01) |
| *H01Q 21/20* | (2006.01) |
| *H01Q 5/42* | (2015.01) |

(52) U.S. Cl.
CPC .............. *H04B 15/00* (2013.01); *H01Q 1/246* (2013.01); *H01Q 1/42* (2013.01); *H01Q 1/52* (2013.01); *H01Q 5/42* (2015.01); *H01Q 9/045* (2013.01); *H01Q 9/0435* (2013.01); *H01Q 21/205* (2013.01); *H01Q 25/00* (2013.01); *H04B 1/40* (2013.01)

(58) Field of Classification Search
USPC .......... 455/561, 562 A, 562.1; 343/757, 874, 343/879, 890
See application file for complete search history.

(56) References Cited

U.S. PATENT DOCUMENTS

| | | | |
|---|---|---|---|
| 5,481,272 A | | 1/1996 | Yarsunas |
| 5,995,063 A | * | 11/1999 | Somoza ................. H01Q 1/246 343/874 |
| 6,023,245 A | | 2/2000 | Gomez et al. |
| 6,088,002 A | | 7/2000 | Johnson et al. |

(Continued)

FOREIGN PATENT DOCUMENTS

| | | |
|---|---|---|
| EP | 0757880 B1 | 9/2001 |
| EP | 1657784 B1 | 2/2010 |

(Continued)

*Primary Examiner* — Blane Jackson
(74) *Attorney, Agent, or Firm* — Barclay Damon, LLP

(57) ABSTRACT

A canister antenna including a radar transparent housing enclosing an antenna assembly having a plurality of integrated sector antennas. The sector antennas are configured to produce a pseudo-omnidirectional radiation pattern of RF energy about the axis.

16 Claims, 12 Drawing Sheets

(56) References Cited

U.S. PATENT DOCUMENTS

| | | | |
|---|---|---|---|
| 6,222,503 B1* | 4/2001 | Gietema | H01Q 1/1207 343/700 MS |
| 6,411,255 B2 | 6/2002 | Roederer | |
| 7,253,770 B2 | 8/2007 | Yegin et al. | |
| 7,292,198 B2 | 11/2007 | Shtrom et al. | |
| 8,175,648 B2 | 5/2012 | Johnson et al. | |
| 2003/0201939 A1 | 10/2003 | Reece et al. | |
| 2004/0242272 A1* | 12/2004 | Aiken | H01Q 1/246 455/562.1 |
| 2006/0114161 A1 | 6/2006 | Yamaguchi | |
| 2007/0241979 A1* | 10/2007 | Yang | H01Q 1/246 343/765 |
| 2009/0102743 A1* | 4/2009 | Hager | H01Q 1/1242 343/890 |
| 2010/0034134 A1* | 2/2010 | Larsen | H04W 16/28 370/315 |
| 2010/0134374 A1* | 6/2010 | Skalina | H01Q 1/246 343/798 |
| 2012/0133557 A1 | 5/2012 | Beaudin | |
| 2014/0118196 A1 | 5/2014 | Koskiniemi | |

FOREIGN PATENT DOCUMENTS

| | | |
|---|---|---|
| EP | 1782499 B1 | 9/2013 |
| WO | 98/39851 A1 | 9/1998 |

\* cited by examiner

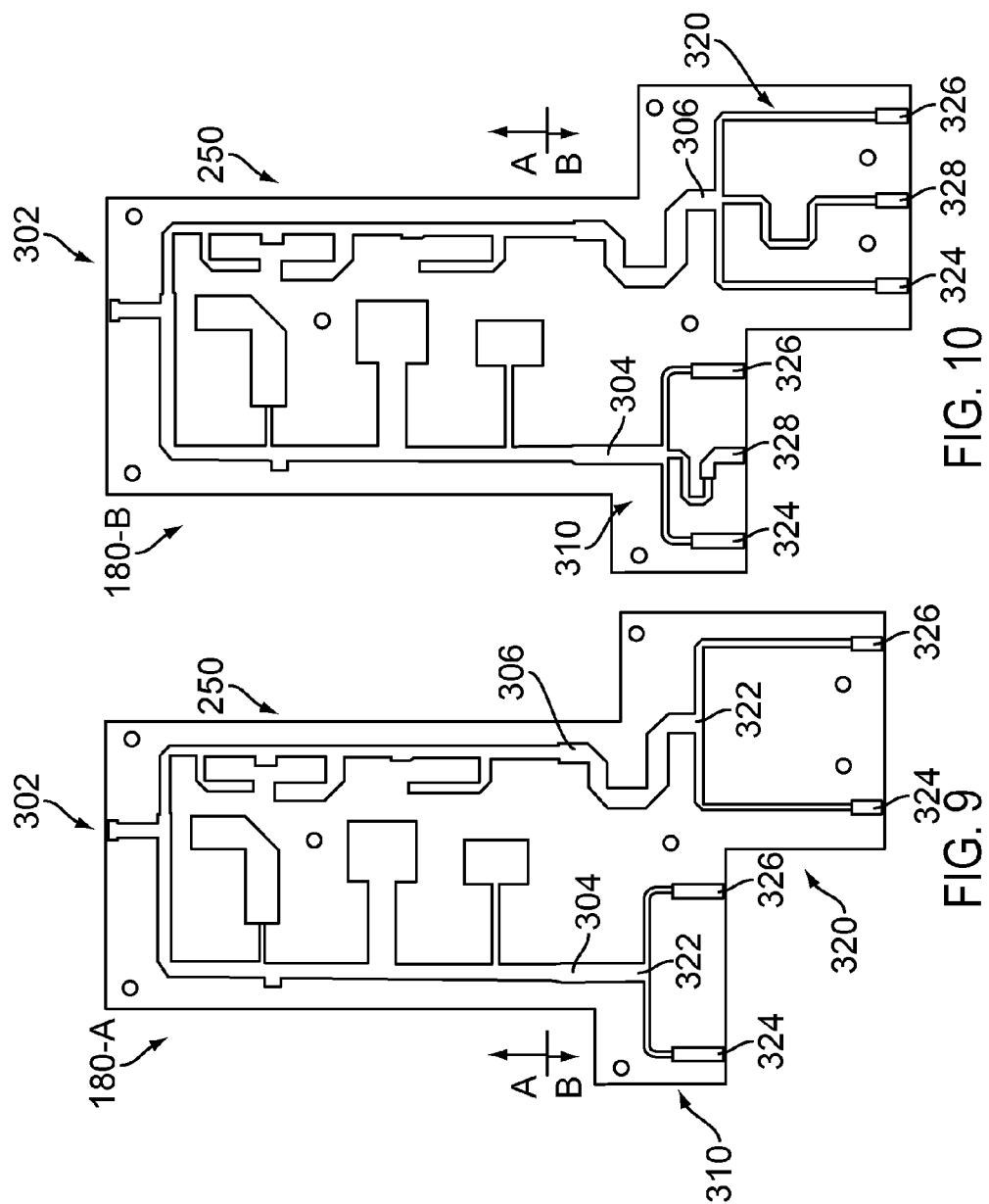

CANISTER ANTENNA PRODUCING A PSEUDO-OMNI RADIATION PATTERN FOR MITIGATING PASSIVE INTERMODULATION (PIM)

CROSS-REFERENCE TO RELATED APPLICATIONS

This application is a non-provisional of, and claims the benefit and priority of, U.S. Provisional Patent Application No. 61/911,776, filed on Dec. 4, 2013. The entire contents of such application is hereby incorporated by reference.

BACKGROUND

The present invention relates to antennas for use in a wireless communications system and, more particularly, to a canister antenna for mitigating Passive InterModulation (PIM).

Typical cellular systems divide geographical areas into a plurality of adjoining cells, each cell including a wireless cell site or "base station." The cell sites operate within a limited radio frequency band and, accordingly, carrier frequencies must be used efficiently to ensure sufficient user capacity in the system.

One way to increase call carrying capacity includes the creation of additional cells sites across a smaller geographic area. Partitioning the geographic area into smaller regions, however, involves purchasing additional equipment and real estate for each site. In addition to being fiscally inefficient, this approach can be aesthetically objectionable inasmuch as such cell sites are typically accompanied by unattractive cellular antennas and base station housing structures. Accordingly, this problem must be addressed by more economical and effective antennas that do not detract from the surrounding environment.

To improve the quality and reliability of wireless systems, service providers often rely on "antenna diversity". Diversity improves the ability of an antenna to see an intended signal around natural geographic features of the landscape, including man-made structures such as high-rise buildings. A diversity antenna array helps to increase coverage as well as to overcome fading. Antenna polarization is another important consideration when choosing and installing an antenna. For example, polarization diversity combines pairs of antennas with orthogonal polarizations to improve base station uplink gain. Given the random orientation of a transmitting antenna, when one diversity-receiving antenna fades due to the receipt of a weak signal, the probability is high that the other diversity-receiving antenna will receive a strong signal. Most communications systems use vertical, slant or circular polarization.

"Beam shaping" is another method to optimize call carrying capacity by providing the most available carrier frequencies within demanding geographic sectors. Oftentimes user demographics change such that the base transceiver stations have insufficient capacity to deal with current local demand within a localized area. For example, a new housing development within a cell may increase demand within that specific area. Beam shaping can address this problem by distributing the traffic among the transceivers to increase coverage in the demanding geographic sector.

Prior art beam shaping solutions utilize complex beam-forming devices (LPAs, controllable phase shifters, etc.), many of which are not well-suited for deployment atop a masthead or tower-top. A significant design effort involves the use of 2- and 3-sector antennas optimized to provide beam-forming within a canister for purpose of increasing "long term evolution" (4G LTE) data rates in a small cellular network.

Additionally, cellular carriers often use GPS signals for accurate timing. In addition to longitude and latitude, the Global Positioning System (GPS) provides an accurate time source. Each GPS satellite contains multiple atomic clocks that integrate time data onto GPS signals to calculate a geographic position. The time data, in addition to calculating longitude and latitude, allows receivers to determine time within a billionth of a second. Cellular carriers use this precise time data for synchronization and operational efficiency of their networks. The GPS time data keeps the base stations in perfect synchronization which, in turn, allows mobile handsets to share the limited radio frequency spectrum efficiently. It is well-known to add a GPS antenna onto a base station for this purpose, however, prior art GPS solutions utilize separate antennas and separate coaxial cables from antenna to receiver. As such, this arrangement is complex and expensive.

The foregoing background describes some, but not necessarily all, of the problems, disadvantages and shortcomings related to canister antennas.

SUMMARY

A canister antenna is provided including a radar transparent housing enclosing an antenna assembly having a plurality of integrated sector antennas. The sector antennas are configured to produce a pseudo-omnidirectional radiation pattern of RF energy about the axis. The pseudo-omnidirectional radiation pattern allows the canister antenna to be directional such that null regions may be aligned with a peak value of external noise to reduce passive intermodulation (PIM) and dramatically increase cellular data rates.

A method for reducing passive intermodulation (PIM) is also provided comprising the steps of: (i) integrating a plurality of sector antennas to produce a pseudo-omnidirectional RF radiation pattern about an axis, the pseudo-omnidirectional RF radiation pattern producing a null region along a radial of the axis; (ii) sensing the radial position of a peak value of external noise produced by the PIM interference; and (iii) rotating the sector antennas about the axis such that the null region coincides with the peak value to mitigate PIM distortion.

The canister antenna is easily connectable by service personnel in the field using a single RF coaxial cable for up to three bands (RF low, RF high, and GPS), via a single mechanical connection. A global positioning system antenna may also be integrated using the same RF coaxial cable.

Additional features and advantages of the present disclosure are described in, and will be apparent from, the following Brief Description of the Drawings and Detailed Description.

BRIEF DESCRIPTION OF THE DRAWINGS

FIGS. 9 through 12 show various printed circuit boards/cards/layouts according to another embodiment of the canister antenna, each printed circuit board having a multiplexer and an integrated low and/or high-band beam forming splitter to conduct multiple bands of RF energy including low, mid-range, and high-band RF energy.

DETAILED DESCRIPTION

The present invention is a beam shaping canister antenna with integrated GPS option and beam forming options for use with wireless base stations. The canister antenna integrates polarization diversity, beam-forming and/or GPS into a single antenna canister. As such, the antenna is configured for deployment atop a masthead or other cellular base station and is connectable to the base station transceiver by a single coaxial cable.

Figure 1:
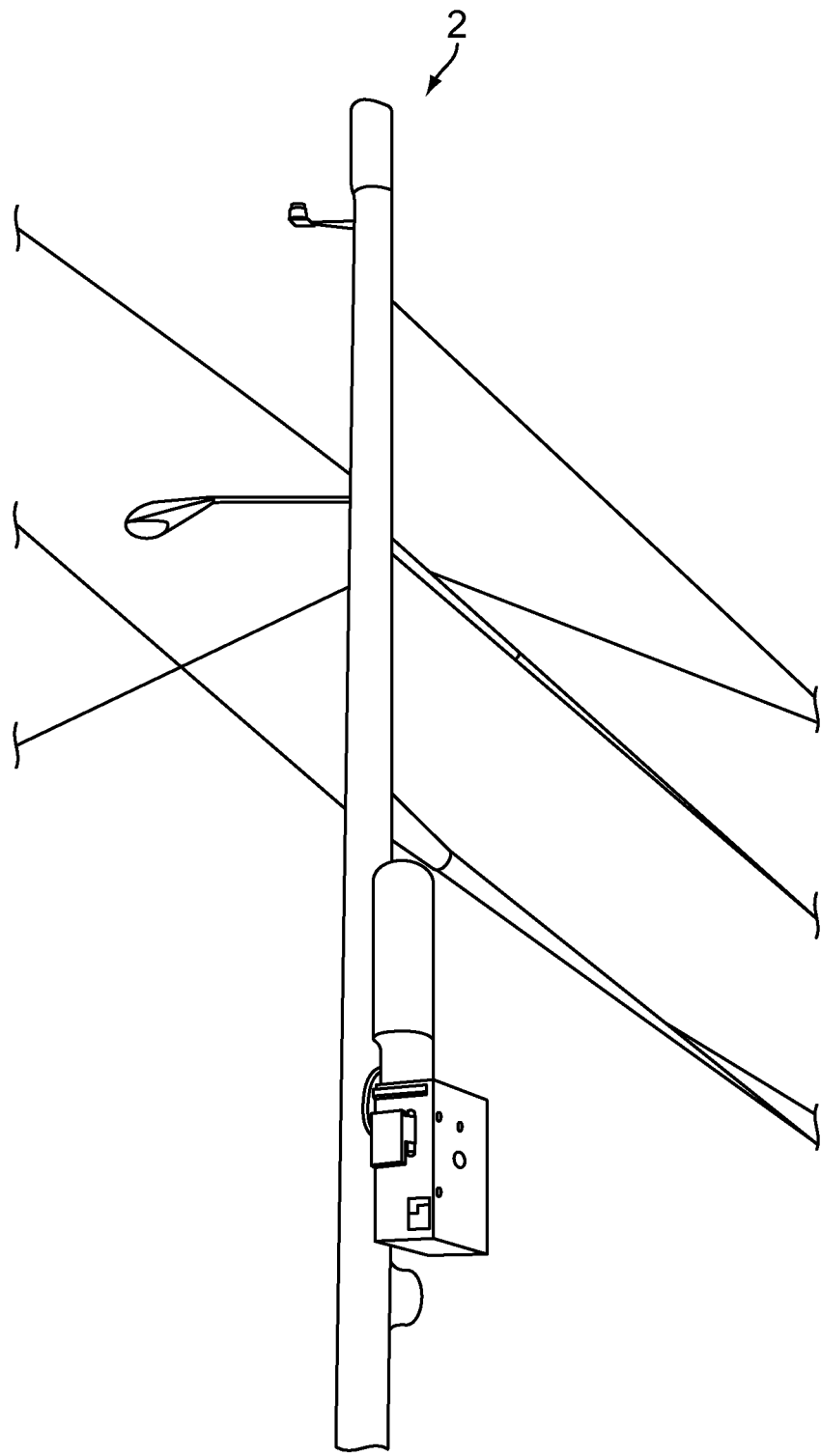
FIG. 1 is a perspective view of a canister antenna disposed atop a conventional utility or telephone pole.
Figures 2, 3:
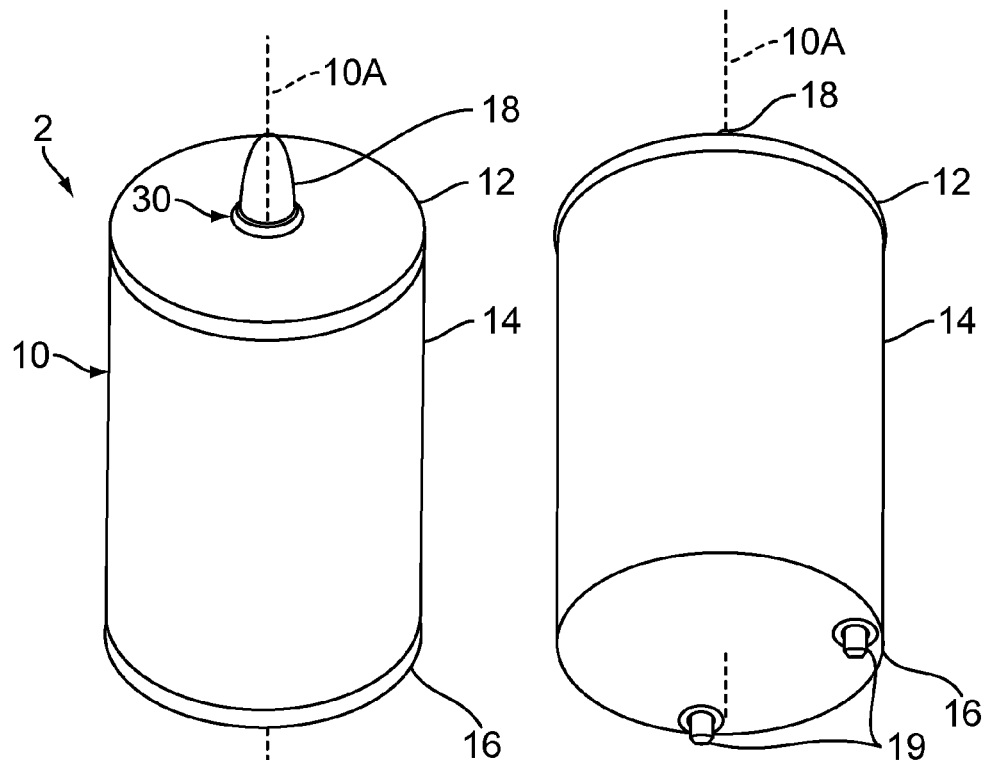
FIG. 2 is a top perspective view of the canister antenna according to one embodiment.
FIG. 3 is a bottom perspective view of the canister antenna shown in FIG. 2.

FIGS. 2 and 3 depict top and bottom perspective views, respectively, of the canister antenna 2 of the present invention. The antenna 2 generally comprises a housing 10 enclosing various sector antennas supported by a multi-sector standoff spline or hub (not shown in FIGS. 2 and 3). The hub mounts the sector antennas to produce a multi-sector cellular pattern, but may be sculpted as needed by integral beam forming. The canister antenna 2 may also include a global positioning system (GPS) antenna, however, a GPS antenna is not essential for practicing the invention. The various components are detailed as follows:

Housing

As seen in FIGS. 2-6 the canister antenna 2 is fully-enclosed in a three-section housing or radome structure 10 disposed along a central axis 10A. The housing 10 comprises a disc-shaped upper or top end cap 12, a tubular or cylindrical midsection or body 14, and disc-shaped lower or bottom end cap 16. Furthermore, the housing 10 defines first and second cavities FC, SC for enclosing an internal antenna assembly 100 including a GPS antenna (FIGS. 13A-13b 20. The first cavity FC is formed by the tubular body 14 and the disc-shaped upper and lower end caps 12, 16. The second cavity SC is formed by a dome-shaped enclosure 18: (i) attached to the upper end cap 12, (ii) aligned with the central axis 10A, and (iii) accessed through an aperture 30 formed in the upper end cap 12.

All three sections 12, 14, 16 may be fabricated from a fiber-reinforced, resin impregnated composite or a PVC material which are transparent to RF energy. Such fiber reinforcement may include S-glass, E-glass, or Kevlar fibers disposed in an epoxy resin matrix. The tubular body or midsection 14 is a uniform hollow cylinder open at both ends. The disc-shaped lower end cap 16 includes a flat circular wall and surrounding lip sized for a compression-fit onto one end of the tubular body 14. A plurality of RF port connectors 19 are panel mounted through the circular wall of the lower end cap 16. The disc-shaped upper end cap 12 is likewise formed with a substantially flat circular wall and surrounding lip sized for a compression-fit onto the other end of the tubular body 14. The dome-shaped enclosure 18 generally conforms to the shape of a GPS antenna 20 which forms a substantially spiral shape.

Figure 4:
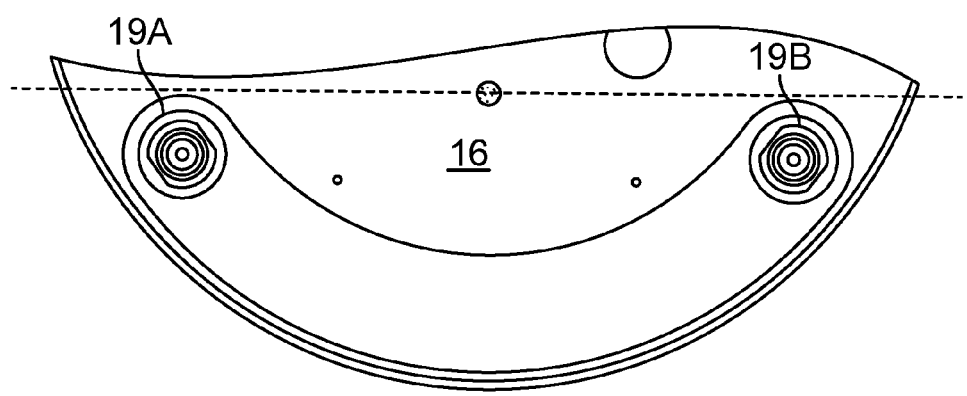
FIG. 4 is a broken away bottom perspective view of the canister antenna shown in FIG. 2.

An internal antenna assembly 100 (see FIG. 6) is fully contained within the tubular body 14. Upon assembly, the three sections 12, 14, 16 may be bonded or plastic-welded together to seal the antenna elements therein, such that housing 10 is completely weatherproof. As seen in FIG. 3, there are at least two RF port connectors 19A, 19B for feeding a first signal containing the GPS mid-band (1575.42 MHz) and the two duplex cellular signals, i.e., the low RF band within a range of between approximately 698 MHz and 960 MHz and a high RF band within a range of between approximately 1710 MHZ to 2170 Mhz. One skilled in the art will understand that standards such as Long Term Evolution (LTE) are increasingly using wider bands of spectrum (e.g., up to 20 MHz per channel) to increase access rates, hence the low and high RF bands may vary to accommodate ultra-mobile broadband (UMB) ranging from between approximately 1.25 MHz to 20 MHz. As seen in FIG. 4, one RF port connector 19A feeds the mid-range GPS band while the duplex cellular signals, conducting the low-band and high-band RF energy, are fed at a first polarization (+45 degrees). A second connector 19B feeds the other two cellular signals conducting the low-band and high-band RF energy at a second offset polarization (−45 degrees).

Additional RF connectors 19 may be required for internal antenna configurations designed to provide certain beam patterns. More specifically, to form three (3) beam sectors, six RF connectors 19 may be required (if polarization diversity is desired). Similarly, to form two sectors, four RF connectors 19 may be required. It should be appreciated that the RF energy for conducting mid-range bands (1575.42 MHz) for GPS may be fed through a separate RF connector. In this case, a separate-dedicated connector 19 may be provided for conducting the mid-range band of RF energy for GPS. A discussion of the various internal antenna configurations and radiation patterns is provided below in connection with FIGS. 5A-5E. All cellular and/or combined cellular/GPS RF connectors 19 may be industry-standard RF connectors. If a dedicated GPS connector is employed, an industry-standard RF/GPS connector may be used to effect the connection between a coaxial cable and the GPS antenna (discussed in greater detail below).

GPS Antenna

The GPS antenna 20 may comprise any suitable GPS antenna such as a turnstile antenna with dipole and/or microstrip antenna elements. The signals from the GPS satellites operate in spectrum of the LI band (1575.42 MHz) with a minimum signal level of −162.0 dBW. To maintain signal strength to a minimum, the GPS antenna 20 must have a clear view of the sky to conduct or "see" the signals. This is accomplished within the radome-shaped protrusion 18 at top of the housing 10, which additionally helps to shed water and ice. A single RF coaxial transmission cable is connected to the GPS antenna 20 and leads into housing 10. A variety of suitable GPS antennas are commercially available, such as a timing reference antenna with a 26 dB onboard amplifier and narrow band high rejection filtering. The GPS antenna 20 is contained within its own housing which slides into the conforming domed protrusion 18 at the center of the disc-shaped upper end cap 12. The GPS antenna 20 may be secured therein by a retaining flange screwed through the upper end cap 12.

Internal Antenna Configurations

The canister antenna 2 includes an internal antenna assembly 100 which includes a plurality of sector antennas, i.e., a first sector antenna 100A, a second sector antenna 100B, and a third sector antenna 100C, which are assembled in a polygon arrangement about the central hub 160. It should be appreciated that the central hub 160 is coaxially aligned with the central axis 10A of the canister antenna 10.

Each sector antenna 100A, 100B, 100C includes a ground plane 110A, 110B, 110C and at least one of the cooperating low-band or high-band antennas 120, 130. Each ground plane is essentially tangential to a ring circumscribing the axis 10A. In the described embodiment, each sector antenna 100A, 100B, 100C includes a low-band antenna 120 and a high-band antenna 130 which are mounted to and spaced apart from a respective one of the ground planes 110A, 110B, 110C.

As mentioned above, the sector antennas 100a, 100B, 100C are integrated to produce one of a variety of pseudo-omnidirectional radiation patterns. For example, the triangular arrangement of sector antennas shown in FIGS. 6 and 7, produce the cloverleaf, peanut and heart-shaped pseudo-omnidirectional radiation patterns shown in FIGS. 5A, 5B, and 5C, respectively. Each of these configurations may optionally include integral beam forming and optional integrated GPS.

A pseudo-omnidirectional pattern is formed by sector antennas which are operatively coupled or integrated to form null regions N in areas between peak transmissions. The sector antennas produce the pseudo-omnidirectional radiation pattern which comprises at least two lobes each having a peak transmission along a radial vector. The lobes of the sector antennas are integrated to produce a circular shape, a partial circle or circle sector.

A null region is produced in a valley or trough between adjacent radial transmissions. Due to the integrated nature of the sector antennas 100A, 100B, 100C, a null region is not an area which is void of RF transmissions, but rather is an area having a transmission value less than the maximum gain of the null region N.sector antennas. Hence, a null region N, while being lower in amplitude than the adjacent radial transmissions, will, by definition, never be void of RF energy or have a zero amplitude signal.

The null value(s) produced by the pseudo-omnidirectional radiation patterns may be used in conjunction with measured values of external noise to mitigate or passive intermodulation (PIM) in a canister antenna. More specifically, by (i) measuring the peak values of external noise, i.e., determining the radial position of the peak noise relative to the radial position of the null regions N produced by the integrated sector antennas 100A, 100B, 100C, and (ii) rotating the canister antenna 2 such that the null regions N correspond to, or align with, the radial position of the peak values of external noise. passive-intermodulation (PIM) is reduced which improves wireless data rates.

Figure 5C:
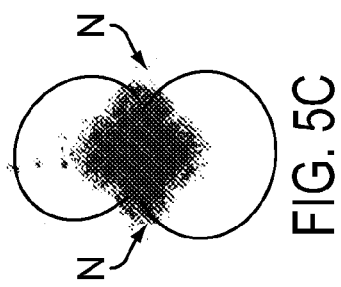
FIGS. 5A through 5E illustrate various pseudo-omnidirectional beam patterns produced by the canister antenna.
Figure 5B:
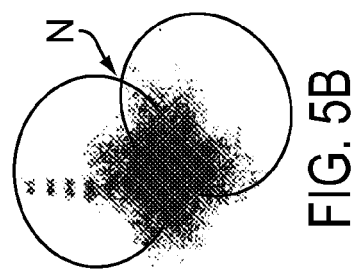
Figure 5E:
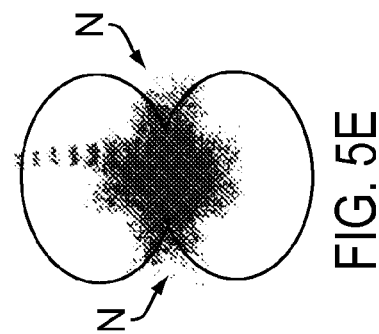
Figure 5A:
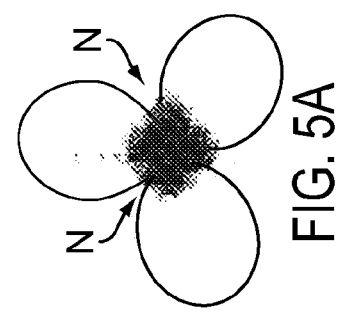
Figure 6:
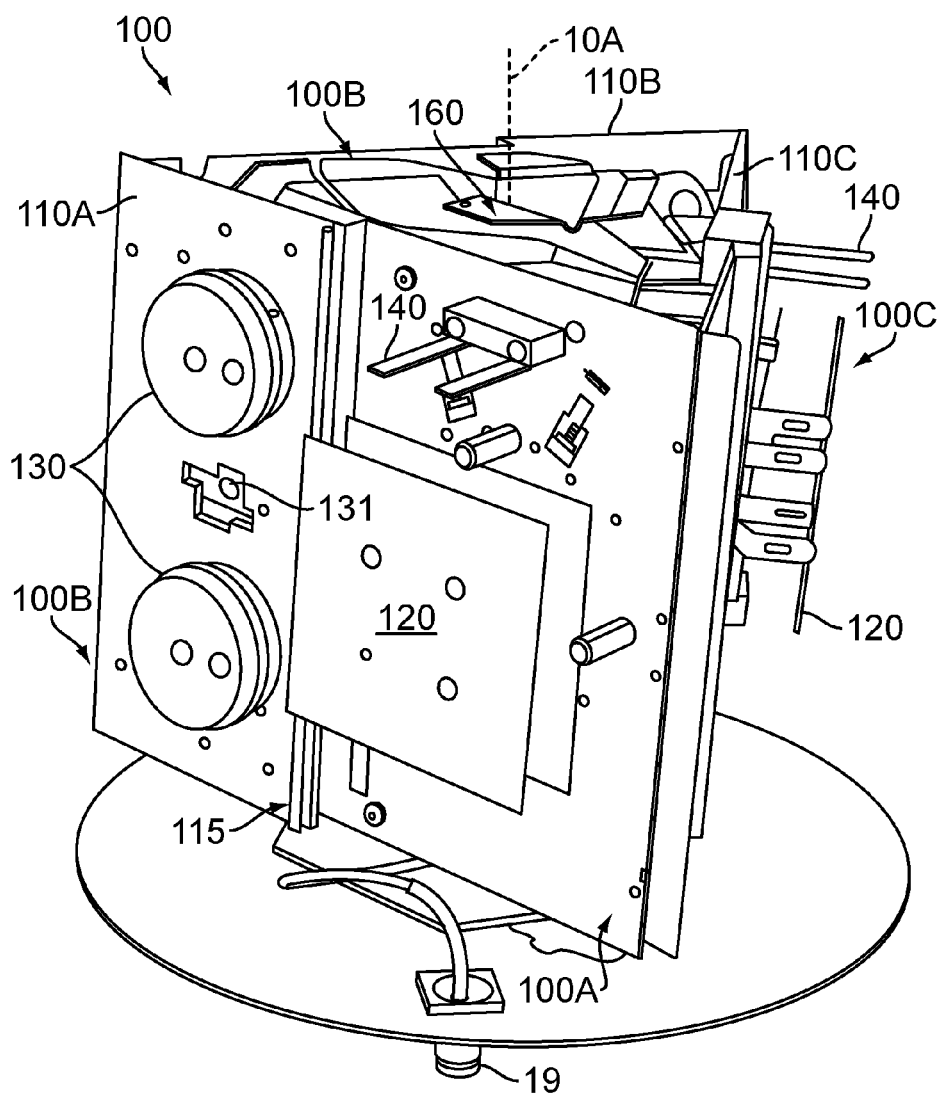
FIG. 6 is a perspective view of an internal antenna assembly for use in one embodiment of the canister antenna, which internal antenna assembly employs a plurality of integrated sector antennas for producing a pseudo-omnidirectional cloverleaf radiation pattern.
Figure 7:
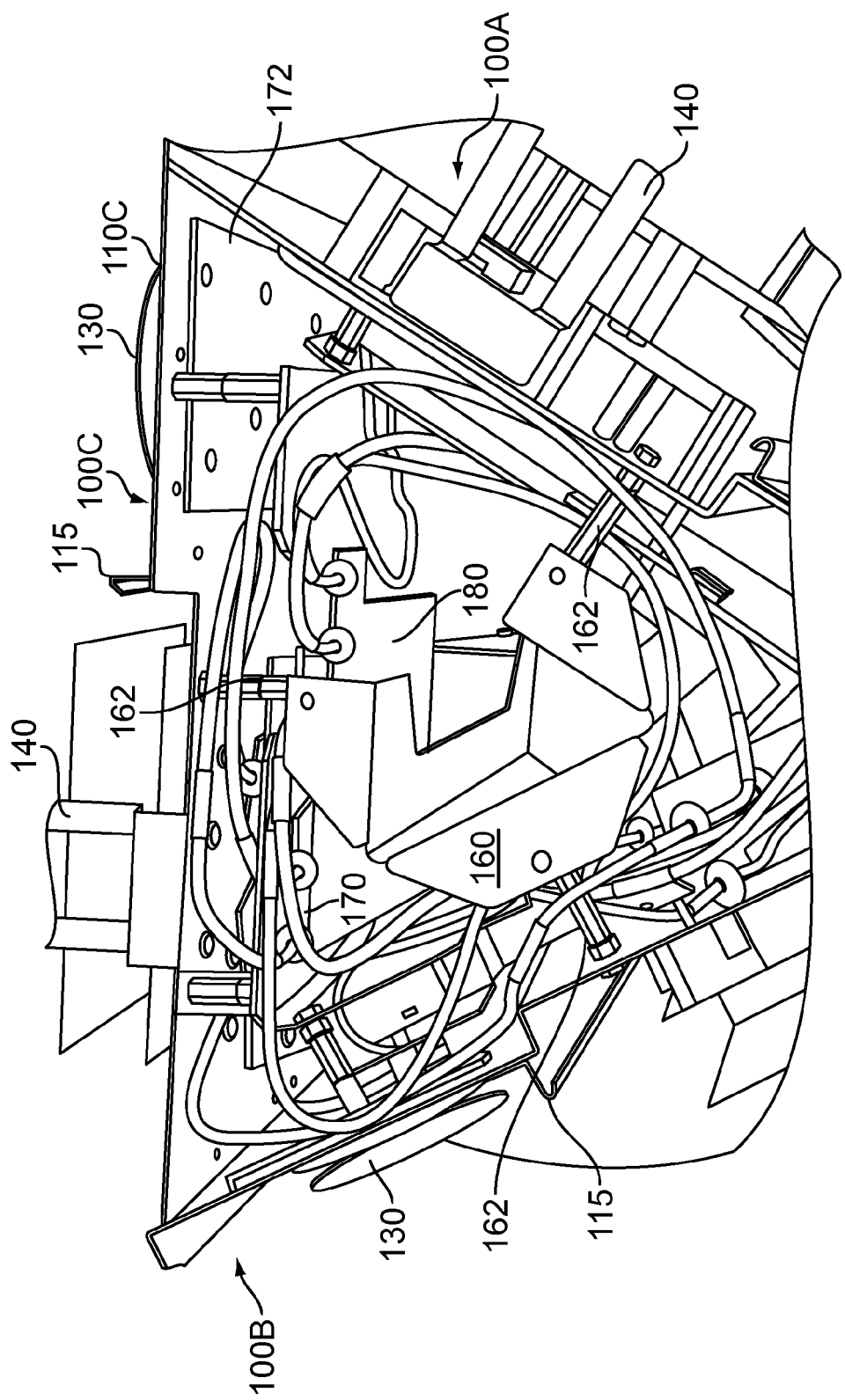
FIG. 7 is a top view of the internal antenna assembly shown in FIG. 6.

A pseudo-omnidirectional cloverleaf radiation pattern, depicted in FIG. 5A, may be achieved with the three sector antenna arrangement shown in FIGS. 6 and 7.

A pseudo-omnidirectional heart-shaped radiation pattern, depicted in FIG. 5B, may be achieved using two of the three sector antennas of the triangular antenna configuration shown in FIGS. 6 and 7. Alternately, this pattern may be achieved by two or more sector antennas of a four sector rectangular shaped antenna arrangement. Such a rectangular-shaped antenna arrangement is shown in FIG. 8 of the drawings, however, additional sector antennas would be substituted for the inactive side panels 210B and 210D adjacent the active sector antenna panels 210A, 210C.

Figure 8:
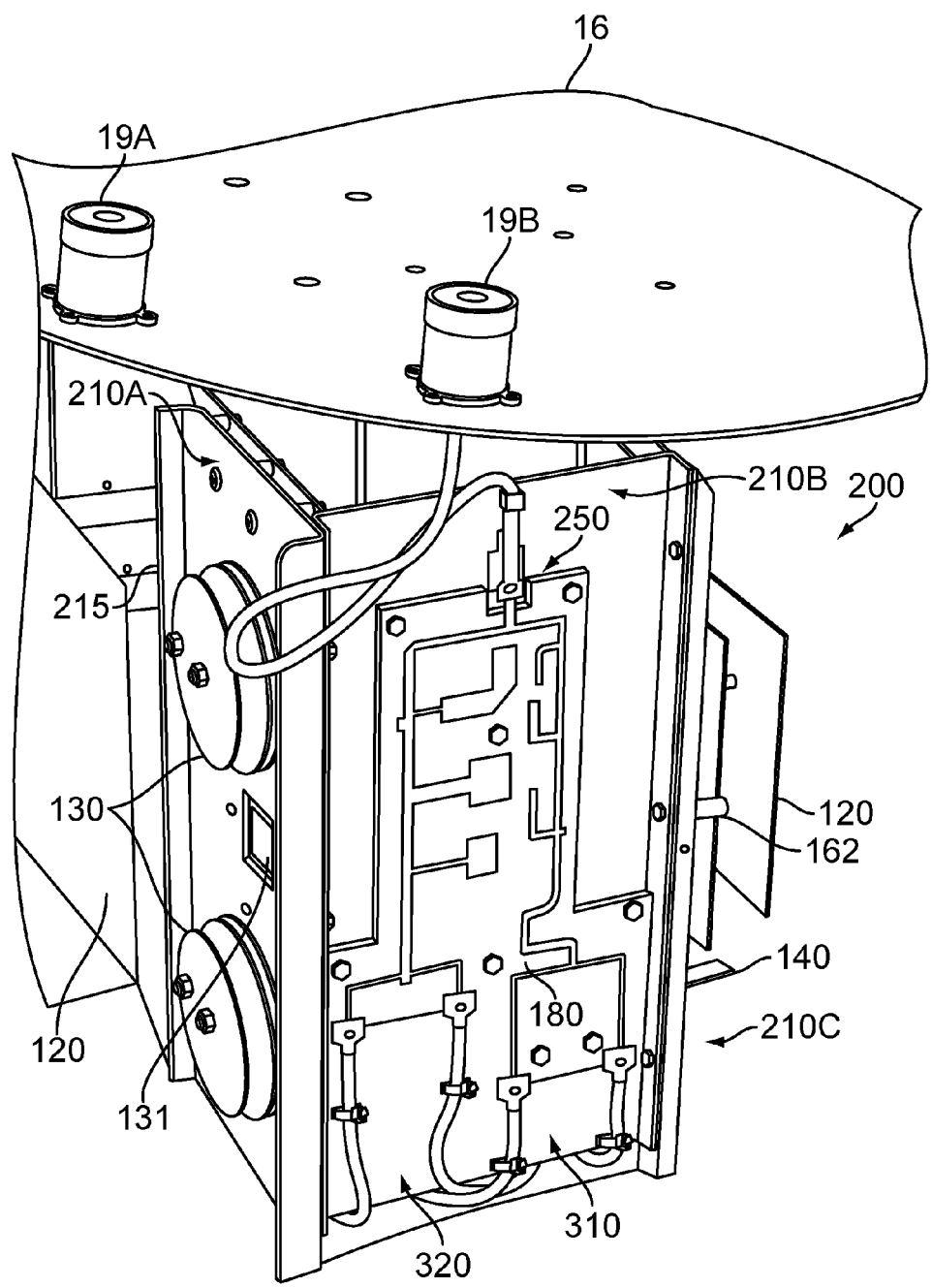
FIG. 8 is a perspective view of an internal antenna assembly according to another embodiment employing a plurality of sector antennas for producing a pseudo-omnidirectional peanut radiation pattern.

A pseudo-omnidirectional peanut shaped radiation pattern, depicted in FIG. 5C, may be achieved using two sector antennas disposed in opposite directions such as the rectangular antenna arrangement shown in FIG. 8 of the drawings. The triangular antenna configuration of FIGS. 6 and 7 is not a viable arrangement inasmuch as the radiation pattern requires that beams be disposed along a straight angle or one-hundred and eighty degrees (180°). Alternately, this pattern may be achieved by two or more sector antennas of a rectangular or other polygon-shaped antenna arrangement.

Figure 5D:
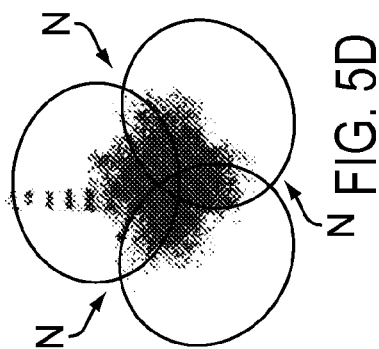

Slightly different pseudo-omnidirectional cloverleaf and peanut shaped radiation patterns are shown in FIGS. 5D and 5E. Therein, the null regions are less severe or dramatic, i.e., produce minimum values which are higher than the related cloverleaf and peanut radiation patterns shown in FIGS. 5A and 5B. These patterns, while perhaps less effective in reducing PIM provide a different coverage area which may be more desirable than the increased performance. It should also be appreciated that while the cloverleaf, peanut and heart-shaped pseudo-omnidirectional radiation patterns may be most commonly employed, other radiation patterns are contemplated by the canister antenna 2 of the disclosure. For example, many more sectors may employed to produce a six- or eight-sector pseudo-omnidirectional radiation pattern.

An embodiment of an internal antenna assembly 100 for generating the cloverleaf patterns of FIGS. 5A and 5D is described with reference to FIGS. 6 and 7. As mentioned in the preceding paragraphs, the antenna assembly 100 includes three sector antennas 100A, 100B, 100C, each creating one lobe of the pseudo-omnidirectional cloverleaf radiation pattern with a square or low-band antenna 120, and circular or high-band antennas 130. Each of the sector antennas 100A, 100B, 100C includes a planar ground plane panel 110A, 110B, 110C which are attached together in an equilateral triangle, and attached endwise centrally on the lower end cap 16 of the housing 10. More specifically, each ground plane panel 110A, 110B, 110C is defined by a central vertical division 115 with the low-band and high-band antennas 120, 130 on each side of the division 115. The low-band antenna 120 occupies the right division of FIG. 6 and the high-band antenna 130 occupies the left side in two vertically-stacked circular arrays. The circular high-hand antennas 130 are coupled together at junction 131. All of the low-band and high-band antennas 120, 130 are spaced apart from the ground plane panels 110A-110C by a plurality of plastic standoffs. Each of the low-band and high-band antennas 120, 130 produce a beam width of, for example, 65 degrees in the horizontal direction. Further, each of the low-band and high-band antennas 120, 130 include two-polarization portions receiving positive and negative slant polarizations independently. At least two RF port connectors 19 are required including a first connector 19A (see FIG. 4) for feeding a first RF signal containing the GPS L1 band (1575.42 MHz) and the two low and high-band cellular signals. An additional third RF connector 19 (not shown) may be required for a separate GPS feed, or alternatively the GPS signal can be carried through the second connector 19B and triplexed to conduct low, mid-range (GPS) and high-band RF energy.

Referring back to FIG. 6, the low-band antennas 120 are each excited by two feeds offset at −45 and +45 degrees with respect to each other, resulting in the radiation of waves in orthogonally polarized modes. A protruding two-prong channel isolator 140 is mounted directly above each low-band antenna 120 to serve as an electromagnetic shield to isolate the orthogonally polarized modes.

FIG. 7 is a top view of the omnidirectional cloverleaf internal antenna configuration 100 of FIG. 6. A substantially triangular supporting spine or hub 160 is mounted centrally inside the three ground plane panels 110A, 110B, 110C, spine 160 being provided with endwise flanges for screw attachment to the top and bottom sections 12, 16 of housing 10 and also attached to the three ground plane panels 110A, 110B, 110C by standoffs 162. PC cards 170, 172 including at least a beam forming section are mounted behind the associated ground plane panel 110 and supporting spine 160, i.e., by standoffs 162 protruding rearwardly from the respective ground plane panel 110. Each of the beam forming sections may include a low-band splitter and a high band splitter for conducting low and high-band RF energy to and from each of the low and high-band antennas 120, 130. Additionally, the PC cards 170, 172 may include a multiplexer 300 (see FIG. 14), e.g., a diplexer or triplexer, for decoupling or combining low-band (COM), mid-range (GPS) and high-band (COM) signals to each of the low-band and high-band splitters. These will be discussed in greater detail hereinafter.

Thus, each lobe inclusive of each pair of vertically stacked low-band antennas 120 and high-band antennas 130 has juxtaposed low and high-band PC feeder cards 170, 172 mounted behind the associated planar antenna 120, 130, i.e., interiorly of the conjoined ground plane panels 110A-110C. In addition, a combination multiplexer/beam former PC card 180 is mounted behind two of the feeder PC cards 170, 172 effectively straddling the two.

An embodiment of an omnidirectional peanut internal antenna assembly 200 for generating the pattern of FIG. 5C with integrated beam forming and optional GPS is described with reference to FIG. 8. Antenna assembly 200 (shown inverted) includes two planar ground planes 210A, 210C (the second ground plane 210C being obscured in the figure) and two side panels 210B, 210D (the second side panel 210D being obscured). The two ground panels (front and rear) 210A, 210C are defined by a vertical division 215, with a plurality of low and high-band antennas 120, 130 on each side of the division. A low-band antenna 220 occupies the left division of both front and rear panels 210A, 210C of FIG. 8, and two high-band antennas 230 occupy both right divisions of both front and rear panels 210A, 210C in a vertically-stacked array. The two low-band antennas 220 and two high-band antennas 230 are mounted to and spaced-apart from the respective ground plane panels 210A, 210C by a plurality of plastic standoffs directly in front of ground plane panels 210A, 210C. Each of the low and high-band antennas 220, 230 may be configured for a beam width of up to 120 degrees in the horizontal direction. The internal antenna assembly 200 is also polarized receiving each of the polarized bands, i.e., +45, −45 degree, low and high frequency energy independently. The low-band antenna 220 is excited by two feeds, offset at −45 and +45 degrees with respect to each other, resulting in radiation waves which are orthogonally polarized. A protruding two-prong channel isolator 140 is mounted directly above the low-band antenna 220 to serve as an electromagnetic shield to isolate the orthogonally polarized modes. A substantially rectangular supporting spine (obscured) is mounted centrally inside the two ground planes 210A, 210C and two side panels 210A, 210D. In the described embodiment, PC cards 170, 172 are employed to provide the beam forming splitters, i.e., a low and high-band splitter, and a multiplexer conducting low and high-band RF energy to the respective low and high-band splitters.

Combination Multiplexer/Beam Former PC Card

The combination multiplexer/beam former PC card 180 may, as stated above, take various configurations depending on the desired antenna characteristics including number of sectors and type of pseudo-omnidirectional radiation pattern (see FIGS. 5A-5E for some of the beam patterns contemplated by the present disclosure).

FIGS. 9-12 show some of the PC Card 180 layouts contemplated for integrating and conducting the low-band, mid-range (GPS) and high-band RF energy to the respective low-band, high-band and GPS antennas 120, 130, 220, 230, 20.

Figure 13A:
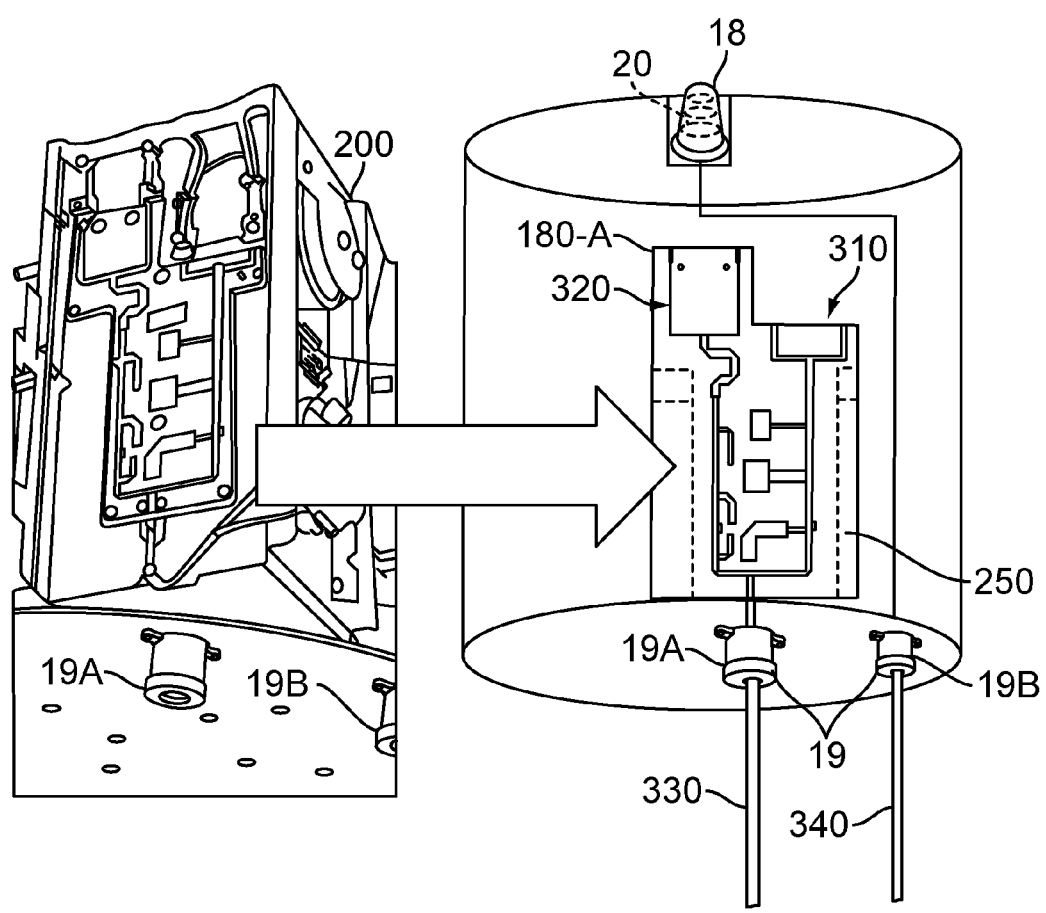
FIGS. 13A through 13D illustrate the internal antenna assembly connections to a respective base station.

In FIGS. 9 and 13A, the multiplexer/beam former PC Card 180-A includes a multiplexer section A and beam forming section B. In the described embodiment, the multiplexer section A includes a diplexer 250 for conducting low and high-band RF energy from an input 302 to multiple outputs 304, 306, one of the outputs 304 conducting low-band RF energy and another output 306 conducting high-band RF energy. The beam forming section B includes a low-band splitter 310 and a high-band splitter 320. Each of the low-band and high-band splitters 310, 320 includes an input 322 and multiple outputs 324, 326.

The input 322 of each low-band and high-band splitter 310, 320 connects to the respective low-band output 304 or high-band output 306 of the diplexer 250. The outputs 324, 326 of each of the low-band and high-band splitters 310, 320 connect to the respective low-band antennas 120, 220 of each of the various sector antennas 110A, 110B, 210A, 210C (depending upon the antenna configuration) and to the respective high-band antennas 130, 230 of each of the various sector antennas 110A, 110B, 210A, 210C (depending upon the antenna configuration employed). Inasmuch as the PC card 180A of FIG. 9 only has two outputs for each of the low-band and high band splitters 310, 320, only two sector antennas 110A, 110B or 210A, 210C of each of the antenna configurations shown in FIGS. 6 and 8, can be active for transmission.

While the embodiment described in the preceding paragraph employs a diplexer 250 for decoupling and combining low-band and high-band RF energy (decoupling when the data travels from a single input to multiple outputs and combining when the data travels from multiple outputs to a single input), it should be appreciated that a triplexer or other signal multiplexer may be employed. For example, a triplexer may be employed when decoupling or combining mid-band RF energy along with low and high-band RF energy. The requirement to conduct mid-band RF energy arises when integrating a global positioning system (GPS) antenna with low-band and high-band sector antennas such as canister antennas shown in FIGS. 13A-13D. Furthermore, while the embodiment described employs low-band and high-band splitters 310, 320 having two outputs 324, 326 for two sector antennas e.g., panels 210A, 210C producing the rectangular peanut shaped radiation pattern, it will be appreciated that the signal may be across three or more outputs to produce a three and four-leaf clover radiation patterns.

Additionally, the multiplexer PC card 180-A or other signal multiplexer may be employed. Additionally, the multiplexer PC card 180-A may combine or decouple feeds for +45 and −45 degree phase shift. Either of the low-bands or high-bands may, if desired, be offset to finely tune the beam/lobe shape in order to deliver precise antenna radiation patterns. Sector and lobe shaping improves noise suppression, which limits interference, increases the number of accessible subscriber channels, boosts network capacity and strengthens coverage.

Figure 13B:
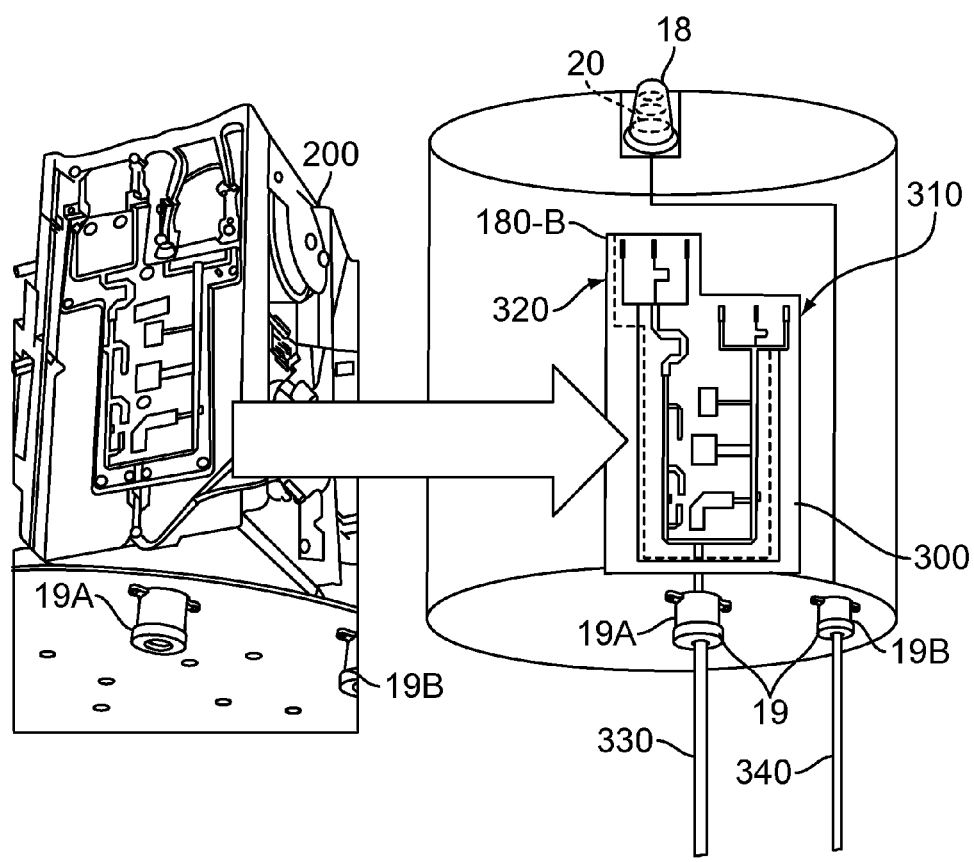

In FIGS. 10 and 13B, the multiplexer/beam former PC Card 180-B includes a multiplexer 250, 300 integrated with low band and high band splitters 310, 320. The PC Card 180-B is similar to that of FIG. 9 except that the low band splitter 310 provides three outputs or feeds 324, 326, 328 for three low band antennas 120 on each of the three sector antennas 110A, 110B, 110C (as shown in FIG. 6.

Figure 11:
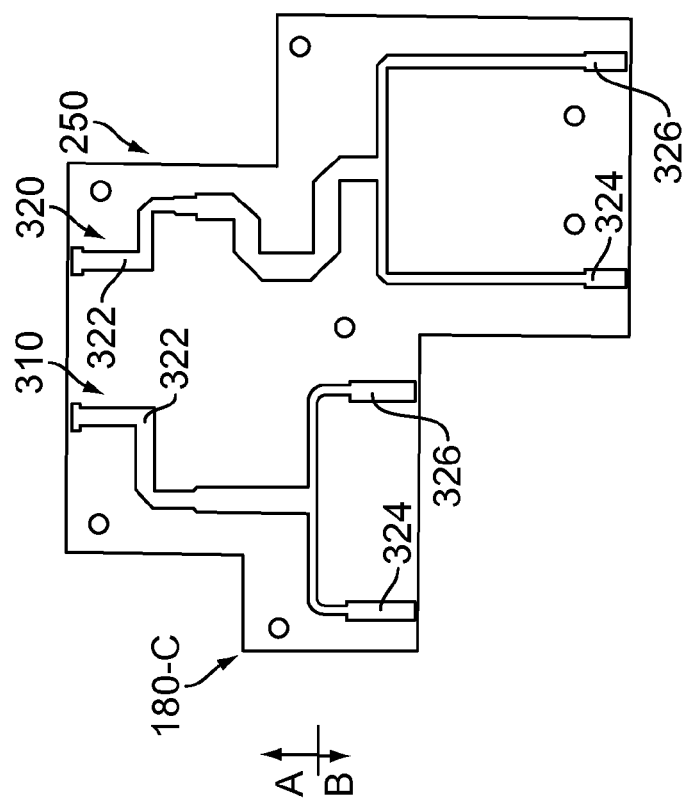
Figure 13C:
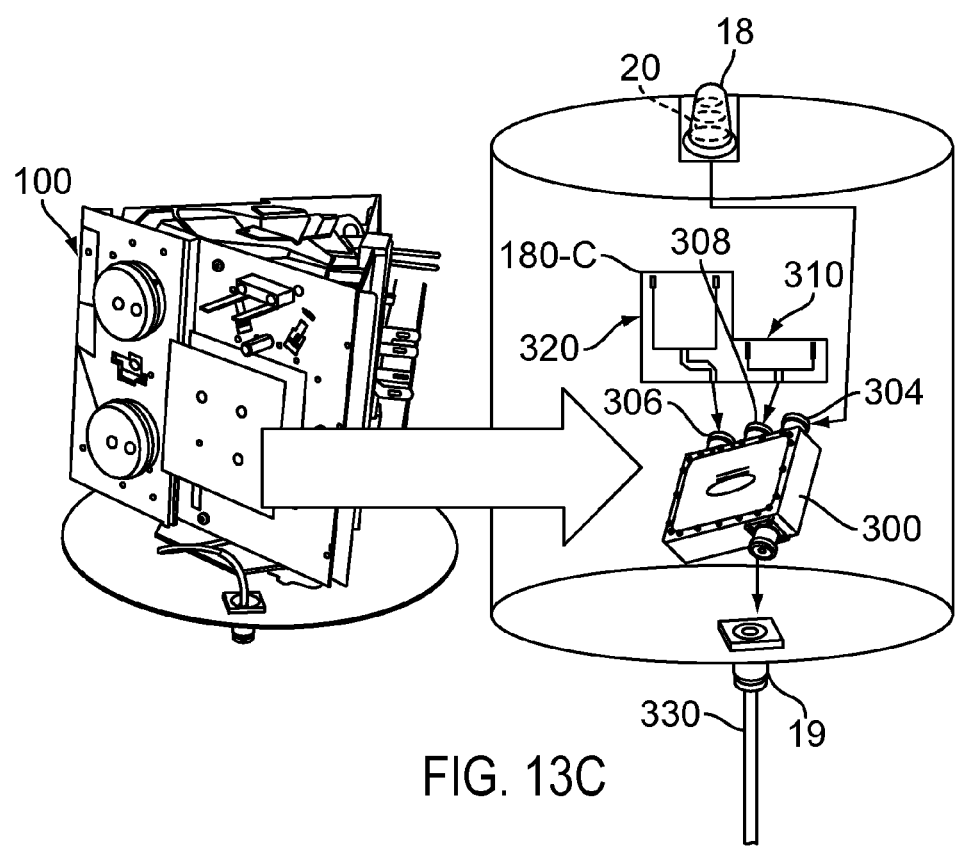

In FIGS. 11 and 13C, the multiplexer/beam former PC Card 180-C is designed for connection to two of the three outputs 306, 308 of a triplexer 300 via the two connections at top, with a multiplexer section A and two-beam forming section B similar to FIG. 9. The GPS feed (see FIG. 13C) circumvents PC Card 180-C and connects directly to the third output 304 of the triplexer 300 which multiplexes the GPS antenna signal onto the same signal as the low and high band signals. A novel triplexer 300 for this purpose is also described below.

Figure 12:
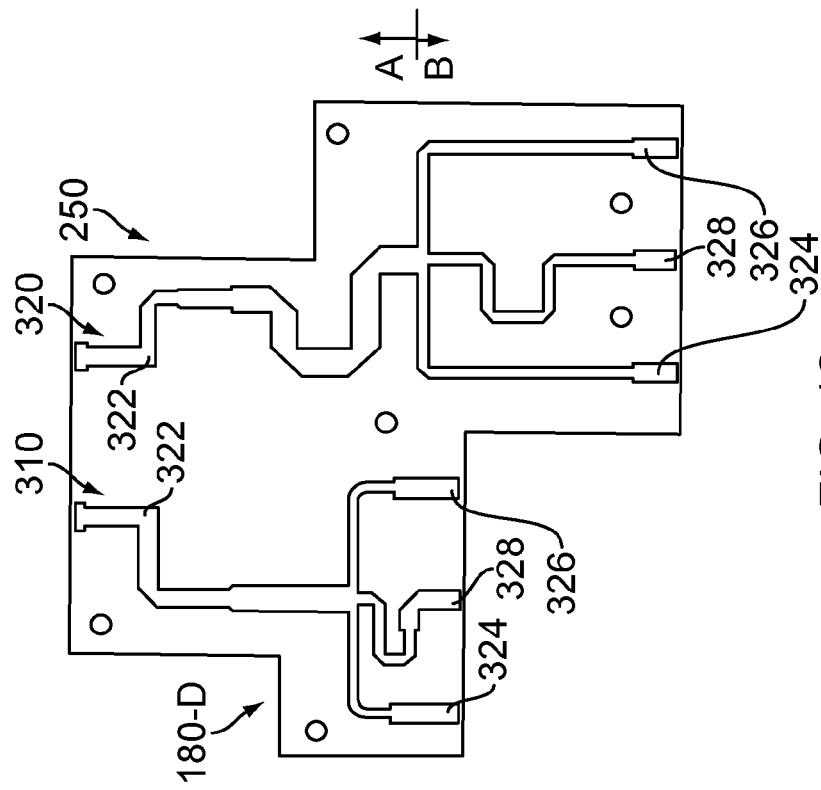
Figure 13D:
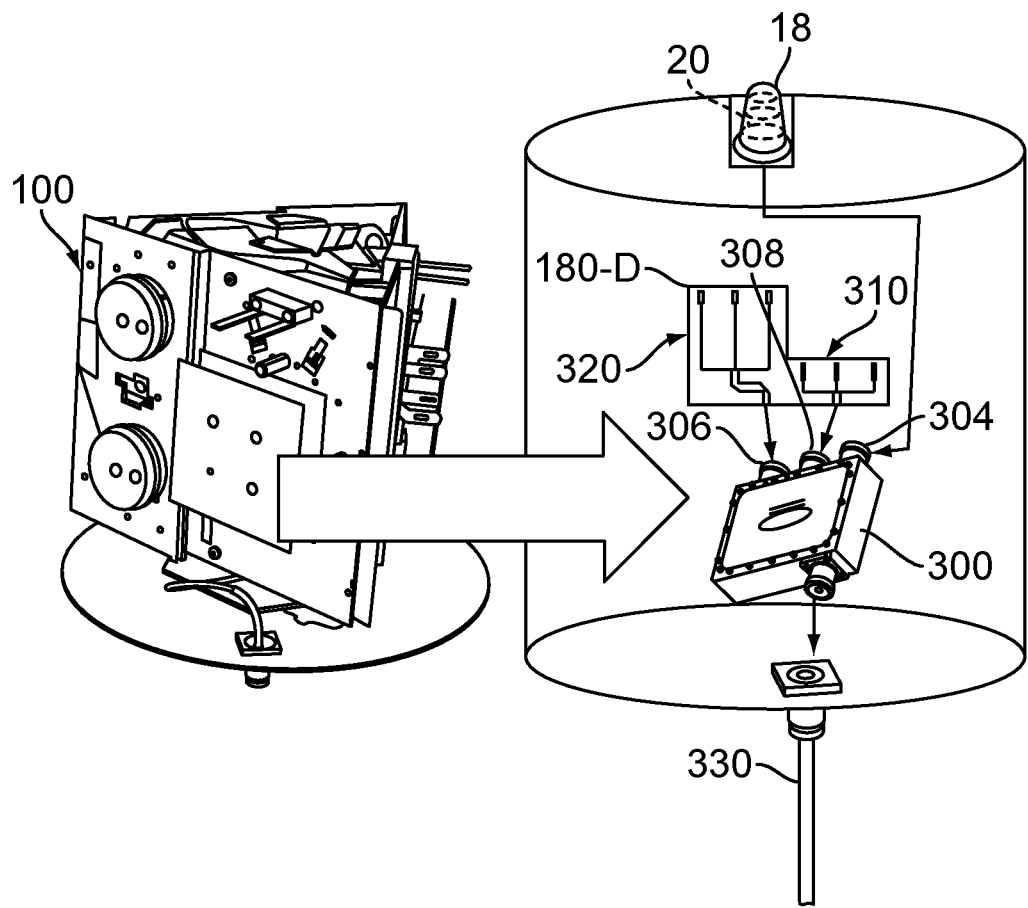

In FIGS. 12 and 13D, the multiplexer/beam former PC Card 180-D includes a triplexer 300 having a third port 304 which multiplexes the GPS antenna signal onto the low-band and high-band RF signals. Again, signals are conveyed on a common coaxial cable 330.

Internal Antenna Connections to Base Station

FIG. 13 A-D illustrates the internal antenna 100, 200 connections to the base station.

FIG. 13A depicts the canister antenna with integrated diplexer 250, a low and high band splitter 310, 320 and an integrated GPS antenna 20. The GPS antenna connection bypasses the PC-Card 180-A via a RF bypass cable 340 connected directly to a dedicated industry accepted RF connector 19B. The common output (lower center) of PC-Card 180-A is connected to a second connector 19 which may be an industry accepted RF connector for connection by a single coaxial cable 330 transmission line that conducts combined low and high-band RF energy to/from the base station.

FIG. 13B depicts a canister antenna with integrated diplexer 250, a three output low and high band splitter 310, 320 and integrated GPS antenna 20. and integrated GPS. Each low and high band splitter 310, 320 has three outputs for connecting to each of the sector antennas 100A, 100B, 100C. The GPS antenna connection bypasses the PC-Card 180-B and is connected directly to a dedicated industry accepted RF/GPS socket connector 19B. The common output of the PC-Card 180-B is connected to a second connector 19A which may be an industry accepted RF connector for connection to a common coaxial cable 330 that conducts the combined low and high band RF energy to/from the base station.

FIG. 13C depicts a canister antenna with a integrated diplexer 250, low and high beam splitter 310, 320 (i.e., forming an omni peanut radiation pattern) and an integrated GPS antenna 20. The GPS antenna bypasses the PC-Card 180-C and is connected directly to an output port 304 of the multiple output multiplexer 300. The common input of the triplexer 300 is connected to a common coaxial cable 330 that conducts the combined low and high band RF energy to/from the base station.

FIG. 13D depicts a canister antenna with integrated diplexer 250, a three output low and high band splitter 310, 320 (connecting to three sector antennas to produce a cloverleaf omnidirectional radiation pattern) and integrated GPS antenna 20. The GPS antenna bypasses the PC-Card 180-D and is connected directly to an output port 304 of the multiple output multiplexer 300. The common input of the triplexer is connected to a common coaxial cable 330 that conducts the combined low and high band RF energy to/from the base station.

Triplexer

Figure 14:
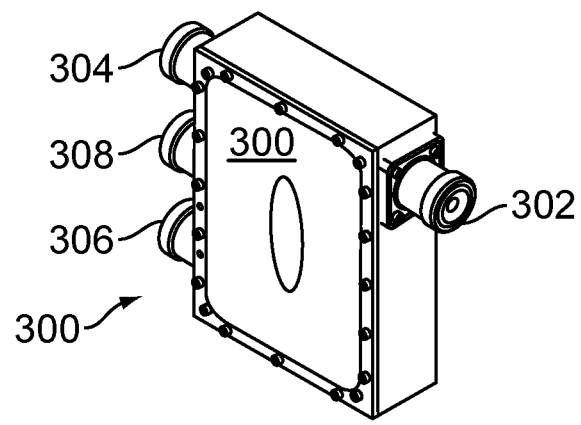
FIG. 14 is a perspective view of the multiplexer including an input port and multiple output ports.

FIG. 14 is a perspective view of the multiple output triplexer 300 of the present invention. Triplexer 300 decouples and combines the low-band and high band RF antennas 110A, 1108, 110C and along with the GPS antenna 20. One triplexer 300 resides in the internal antenna assemblies 100, 200 for combining/splitting in the canister 2, however, one skilled in the art will readily understand that a second identical triplexer 300 is required in the base station to perform the same functions. In combination, the two triplexers 300 eliminate the need for a separate GPS channel feedline and connector, saving the cost of an additional coaxial cable. As seen in FIG. 14, three outputs 304, 306, 308, i.e., one for low band RF, one for the high band RF energy, and a third for the mid-range RF energy (GPS) are combined to facilitate the use of a common coaxial cable 330. This common/single input connector 19 greatly simplifies installation and maintenance of the canister antenna 2.

The embodiment of the present invention provides beam shaping canister antenna with optional integrated GPS option for use in wireless cell towers. The canister antenna facilitates assembly, is highly adaptable, and is fiscally advantageous, i.e., can be economically manufactured. The canister antenna is easily connectable by service personnel in the field using a single RF cable/mechanical connection for multiple bands (Low-band, High-band and mid-band GPS) of RF energy.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. An antenna system, comprising:
 a housing having a tubular body defining an axis, a lower disc-shaped end cap enclosing a lower portion of the tubular body, and an upper disc-shaped end cap enclosing an upper portion of the tubular body, the body, upper end cap and lower end cap defining a first cavity, and the upper end cap having an upwardly projecting dome defining a second cavity, the housing, furthermore, being fabricated from materials which are transparent to RF energy;

an antenna assembly disposed internally of the housing and including a hub rotatable about the axis, the hub mounting a plurality of sector antennas to form a polygon arrangement about the axis, the plurality of sector antennas including:

a first sector antenna configured to conduct low and high-band RF energy, the first sector antenna including: (i) a first ground plane tangential to a ring circumscribing the axis, (ii) at least one low-band antenna mounted to and spaced-apart from the first ground plane, and (iii) at least one high-band antenna mounted to and spaced-apart from the first ground plane;

a second sector antenna configured to conduct low and high-band RF energy, the second sector antenna including: (i) a second ground plane tangential to a ring circumscribing the axis, (ii) at least one low-band antenna mounted to and spaced-apart from the second ground plane, and (iii) at least one high-band antenna mounted to and spaced-apart from the second ground plane;

a third sector antenna configured to conduct low and high-band RF energy, the third sector antenna including: (i) a third ground plane tangential to a ring circumscribing the axis, (ii) at least one low-band antenna mounted to and spaced-apart from the third ground plane, and (iii) at least one high-band antenna mounted to and spaced-apart from the third ground plane;

a global positioning system (GPS) antenna disposed about the central axis, mounting to the hub and projecting into the second cavity of the housing, the GPS antenna configured to conduct mid-band RF energy for providing GPS input signals;

at least two low-band splitters each configured to conduct low-band RF energy from an input to multiple outputs, each of the outputs connecting to one of the low-band antennas of at least two of the plurality of sector antennas;

at least two high-band splitters each configured to conduct high-band RF energy from an input to multiple outputs, each of the outputs connecting to one of the high-band antennas of at least two of the plurality of sector antennas;

at least two multiplexers each configured to selectively conduct off-set, polarized low and high-band RF energy from a single input to multiple outputs, one of the multiplexers conducting low-band RF energy to each of the at least two of the low-band splitters and the other of the multiplexers conducting high-band RF energy to each of the at least two high-band splitters;

the output of at least one of the multiplexers conducting mid-band RF energy to the GPS antenna to transmit and receive GPS signal data;

wherein the sector antennas are configured to produce a pseudo-omnidirectional radiation pattern of RF energy about the axis, the radiation pattern producing at least one null region along a radial of the axis; and wherein the antenna assembly is rotatable about the axis to align the null region with a measured peak value of passive intermodulation (PIM) distortion.

2. The antenna system of claim 1 wherein the low-band splitters, high-band splitters, and multiplexers are patterned on a print circuit card interposing the coaxial cable and each of the antennas.

3. A canister antenna, comprising:

a housing having an internal cavity defining an axis; and an antenna assembly disposed internally of the cavity of the housing and having a plurality of antennas which are operatively coupled together, the antennas producing one of an opposed parallel or continuous polygon arrangement about the axis and a pseudo-omnidirectional radiation pattern of RF energy about the axis, the pseudo-omnidirectional radiation pattern defining at least one null region having a radial position which is selectable by rotation of the antenna assembly about the axis.

4. The canister antenna of claim 3 wherein the housing includes a cylindrical body having upper and lower open ends, and upper and lower disc-shaped caps enclosing the open ends of the cylindrical body, the cylindrical body and disc-shaped end caps fabricated from a material which is transparent to RF energy.

5. The canister antenna of claim 3 wherein each antenna includes a ground plane and a planar antenna spaced apart and cooperating with the ground plane to conduct RF energy, wherein each ground plane is attached to a central hub to produce a polygon shape about the axis and wherein the antennas are integrated to conduct RF energy which is polarized to produce the pseudo-omnidirectional beam pattern.

6. The canister antenna of claim 5 further comprising: a global positioning system (GPS) antenna mounting to the central hub, and a multiplexer configured to conduct a mid-range band of RF energy to the GPS antenna and another band of RF energy to at least one of the antennas.

7. The canister antenna of claim 3 wherein each antenna is configured to conduct low and high-band RF energy, the antenna including (i) a ground plane tangential to a ring circumscribing the axis, (ii) at least one low-band antenna mounted to and spaced-apart from the ground plane, and (iii) at least one high-band antenna mounted to and spaced-apart from the ground plane.

8. The canister antenna of claim 7 further comprising:

at least one low-band splitter configured to conduct low-band RF energy from an input to multiple outputs, each of the outputs connecting to one of the low-band antennas of at least two of the antennas;

at least one high-band splitters each configured to conduct high-band RF energy from an input to multiple outputs, each of the outputs connecting to one of the high-band antennas of at least two of the antennas.

9. The canister antenna of claim 8 further comprising: a multiplexer configured to selectively conduct off-set, polarized low and high-band RF energy from a single input to multiple outputs, the multiplexer conducting low-band RF energy to the low-band splitter and high-band RF energy to the high-band splitter.

10. A canister antenna, comprising:

a radome defining an internal cavity having an axis; and an antenna assembly disposed within the cavity of the radome, including:

a plurality of antennas disposed about the axis, each antenna including at least one input for conducting at least one band of RF energy, the antennas operatively coupled together, and integrated to produce a pseudo-omnidirectional radiation pattern about the axis, the antennas receiving input signals which are offset polarized to enhance received signal strength wherein the antennas are integrated by at least one splitter having an input and at least two outputs, one output connecting to an input of one antenna and another output connecting to an input of another antenna.

11. The canister antenna of claim 10 wherein the pseudo-omnidirectional radiation pattern is a shape from the group consisting of a cloverleaf, peanut, and heart radiation pattern.

12. The canister antenna of claim 10 wherein each antenna comprises at least one low-band antenna and at least one high-band antenna, and further comprising at least one low-band splitter and at least one high-band splitter, each of the low and high-band splitters having an input and multiple outputs, the outputs of the respective low and high-band splitters connecting to the low and high-band antennas of each of the antennas, and a multiplexer having an input and multiple outputs, the input of the multiplexer connecting to a coaxial cable for conducting multiple bands of RF energy, one of the outputs of the multiplexer connecting to the input of the low-band splitter, and another of the outputs of the multiplexer connecting to the input of the high-band splitter.

13. The canister antenna of claim 12 further comprising a global positioning system (GPS) antenna and wherein an output of the multiplexer conducts mid-band RF energy to the GPS antenna.

14. A method for reducing passive intermodulation (PIM) in a cellular antenna system, comprising the steps of:

integrating a plurality of sector antennas to produce a pseudo-omnidirectional RF radiation pattern about an axis, the pseudo-omnidirectional RF radiation pattern producing a null region along a radial of the axis;

sensing the radial position of a peak value of external noise produced by PIM; and rotating the sector antennas about the axis such that the null region coincides with the peak value to mitigate PIM distortion.

15. The method according to claim 14 wherein the step of rotating the sector antennas about the axis includes the steps of:

providing an operation with a visual graphic of the null region produced by the sector antennas;

measuring PIM to identify a peak value about the central axis; and rotating the sector antennas about the central axis to align the visual graphic of the null region with the peak value of PIM distortion.

16. The method according to claim 15 wherein the step of integrating a plurality of sector antennas includes the step of:

integrating a global positioning system antenna with the low- and high-band planar antennas of the sector antennas and conducting RF energy via a common coaxial cable.

* * * * *